United States Patent Office 3,574,796
Patented Apr. 13, 1971

3,574,796
PROCESS FOR THE PREPARATION OF
PHOSPHORUS ACID ESTERS
David E. Ramey and Kurt H. G. Pilgram, Modesto, Calif.,
assignors to Shell Oil Company, New York, N.Y.
No Drawing. Filed Oct. 15, 1968, Ser. No. 767,852
Int. Cl. C07f 9/16, 9/40
U.S. Cl. 260—972
7 Claims

ABSTRACT OF THE DISCLOSURE

In the reaction of an alkali metal salt of an alpha-haloacetophenone anion with O,O-dialkyl phosphorohalido- and O-alkyl alkylphosphonohalidothioates to prepare O-[2-halo-1-(polyhalophenyl)vinyl] esters of O,O-dialkyl phosphorothioic and O-alkyl alkylphosphonothioic acids, respectively, increased yields of the esters are obtained when technical grade thioates are pre-treated with a small amount of a triester of phosphorous acid.

BACKGROUND OF THE INVENTION

This invention relates to a process for the preparation of O-[2-halo-1-(polyhalophenyl)vinyl] esters of O,O-dialkyl phosphorothioic and O-alkyl alkylphosphonothioic acids. More particularly, this invention relates to a process for the preparation of O-[2-halo-1-(polyhalophenyl)vinyl] esters of O,O-dialkyl phosphorothioic and O-alkyl alkylphosphonothioic acids wherein technical grade O,O-dialkyl phosphorohalido- and O-alkyl alkylphosphonohalidothioates are pre-treated with a triester of phosphorous acid which reacts with impurities present in the thioate thereby eliminating undesirable side reactions of the alpha-haloacetophenone anion caused by said impurities.

Technical grade dialkyl phosphoro- and phosphonohalidothioates are prepared by direct distillation of the thioate from the reaction mixture in which it was prepared. This technical grade thioate, representing the heart cut obtained over a boiling range, will contain a variety of impurities.

When technical grade thioate is used to prepare a phosphate insecticide, the impurities contained in the thioate exhibit a catalytic effect toward the alpha-haloacetophenone anion causing it to undergo undesirable side reactions. The amount of anion consumed in these catalyzed side reactions is far in excess of the amount of impurities present in the thioate and represents a significant yield loss.

U.S. Pat. No. 3,089,890 sets forth various commercial processes employed to produce dialkyl phosphorochloridothioates and discloses a water-washing process which may be used to remove some non-sulfur containing contaminates from the thioates. However, technical grade thioates which have been subjected to this water-washing process cause nearly the same degree of catalyzed side reactions of the anion as the unwashed thioates.

The reason for the negligible effect of the water-washing lies in the composition of the thioate impurities. In addition to a variety of sulfur and non-sulfur containing phosphorus compounds, the impurities include elemental sulfur and sulfur halides. It is believed that the sulfur and sulfur halides are primarily responsible for the catalyzed side reactions of the anion. Since the water-washing process is most effective in removing non-sulfur containing phosphorus compounds, the concentration of sulfur-containing impurities remains relatively unchanged.

The level of sulfur impurities (as high as 10 percent by weight or more elemental sulfur and sulfur halides) in technical grade thioates can be decreased, generally to less than 0.5 percent by weight, by a redistillation of the technical grade thioate in which ten to twenty percent by weight of it is rejected to each of both the forerun and bottoms. This redistillation is undesirable not only because twenty to forty percent by weight of the thioate is lost to the forerun and bottoms, but also because it involves an additional process step with its attendant problems and costs. The redistillation is also not entirely effective. The catalyzed side reactions of the anion are only diminished in magnitude, but not eliminated.

Other physical methods of purification (such as selective extraction) are also undesirable because they also involve additional process steps.

Chemical treatment methods (e.g., mercury salts) which would convert the impurities into compounds easier to physically separate from the thioate and yet themselves not interfere with the anion-thioate reaction are either unsuccessful because the thioate is also reactive toward the chemical treatment or undesirable because they also involve additional processing of the thioates.

SUMMARY OF THE INVENTION

It has now been discovered that when thioates which have been pre-treated with a minor amount of a triester of phosphorous acid are reacted with the anion, the undesirable catalyzed side reactions of the anion are eliminated.

This invention therefore comprises an improved process for the preparation of O-[2-halo-1-(polyhalophenyl)vinyl] esters of O,O-dialkyl phosphorothioic and O-alkyl phosphonothioic acids (III), useful as insecticides as shown in U.S. Pat. Nos. 3,174,990 and 3,242,043, which are produced by the reaction of O,O-dialkyl phosphorohalidothioates and O-alkyl alkylphosphonohalidothioates (I), respectively, with an alkali metal salt of an alpha-haloacetophenone anion (II) according to the general formula

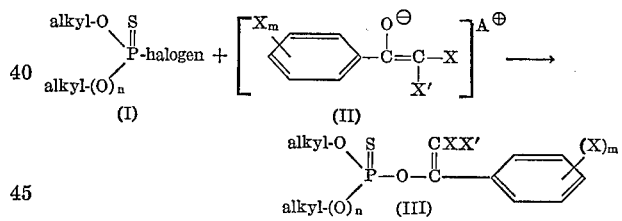

wherein alkyl represents an alkyl radical of 1–4 carbon atoms, $n$ is 0 or 1, X is bromine or chlorine, $m$ is 2 or 3, X' is hydrogen, bromine or chlorine, A is an alkali metal and the halogen atoms bonded to the phenyl ring may be all the same or may be different and may be bonded at any combination of positions on the ring. The yield of esters is increased when the technical grade thioates are pre-treated with a minor amount of a triester of phosphorous acid to eliminate the undesirable side reactions of the alphahaloacetophenone anion caused by impurities present in the thioates.

When added to the thioate, the triester reacts with impurities present in the thioate which cause the anion side reactions. Quite unexpectedly, the products of this pre-treatment are completely innocuous toward the anion-thioate reaction, therby resulting in a twofold advantage. First, the pre-treatment eliminates the catalytic effect of the thioate impurities and second, because the compounds resulting from the pre-treatment are innocuous toward the anion-thioate reaction, the need for any processing to remove the pre-treatment products is also eliminated. The overall result of these two advantages is an increased yield of the phosphate insecticides by a process in which an operationally efficient and readily conducted treatment step has been substituted for a more complex and costly distillation process.

Thus, generally, this invention comprises an improved process for the production of O-[2-halo-1-(polyhalophenyl)vinyl] esters of O,O-dialkylphosphoro- and O-alkyl alkylphosphonothioic acids by the reaction of technical grade O,O-dialkyl phosphorohalidothioates or an O-alkyl alkylphosphonohalidothioates, respectively, with an alkali metal salt of an alpha-haloacetophenone anion, wherein the improvement comprises pre-treating the technical grade thioates with a minor amount of a triester of phosphorous acid of the formula,

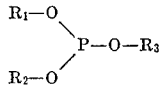

wherein $R_1$, $R_2$ and $R_3$ are any combination of alkyl and aryl, to eliminate undesirable side reactions of the anion catalyzed by impurities present in technical grade thioates.

DESCRIPTION OF THE PRIOR ART

The reaction of some trialkyl and triaryl phosphites with sulfur mono- and dichloride are known; D. C. Morrison, JACS, 77, 181 (1955), A.C. Poshkus et al., JACS, 80, 5022 (1958) and references therein. While the above art shows the reaction of some phosphites with sulfur mono- and dichloride, it does not show that triesters of phosphorous acid may be selectively reacted with elemental sulfur and sulfur halides in the presence of a major amount of dialkyl phosphorohalidothioates or alkyl alkylphosponohalidothioates. Nor does it show that the products of these reactions would be innocuous toward alpha-haloacetophenone anions thereby allowing such pre-treated thioates to be reacted with said anions without intermediate processing.

DESCRIPTION OF THE PREFERRED EMBODIMENTS

Compounds suitable for treating the thioate to eliminate the impurity-catalyzed anion side reactions, according to the process of the invention, are those which are effective against the impurities and yet are unreactive toward both the thioate and the alpha-haloacetophenone anion.

It has been found that triesters of phosphorous acid (known as phosphites) exhibit these properties and therefore are suitable for treating the thioates. These phosphites have the general formula

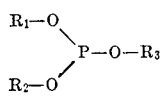

wherein $R_1$, $R_2$ and $R_3$ each are aryl or alkyl and may all be the same or may each be different and may be any combination of alkyl and aryl groups. When $R_1$ $R_2$ or $R_3$ are alkyl they preferably contain 1–4 carbon atoms, i.e., methyl, ethyl, propyl, isopropyl, butyl, sec-butyl, isobutyl, and tert-butyl, with methyl and ethyl being particularl preferred. When $R_1$, $R_2$ or $R_3$ are aryl, suitably they contain 6–10 carbon atoms in one or two ring systems and may be substituted by groups unreactive toward the thioates and alpha-halocetaphenone anions although unsubstituted phenyl is preferred.

Although all phosphites defined above are suitable for treating the thioates, trialkyl phosphites are preferred because the compounds which result from their use in treating the thioates are to some extent removed from the phosphate insecticide during the normal purification process to which the crude insecticide is subjected. Because of their general availability, it is preferred that $R_1$, $R_2$ and $R_3$ are all the same, i.e., trimethyl, triethyl, tripropyl and the like.

The process of this invention, as stated above, is useful in treating thioates to eliminate thioate-impurity catalyzed side reactions of alpha-haloacetphenone anions during the anion-thioate reaction to produce phosphate insecticides. This treatment process may be conveniently incorporated into the process for the preparation of the insecticide. This is done simply by charging the thioate to the reaction vessel and adding the phosphite to it with mixing. The reaction of the phosphite with the impurities is rapid and exothermic, but generally the amount of impurities is small relative to the mass of the thioate and heat dissipation is not a problem. Without further processing, the treated thioate may then be used to prepare the insecticide, conveniently by adding the alpha-haloacetophenone anion to the thioate with stirring, adjusting the addition rate and heating or cooling rate to the individual species of reactants.

At the completion of the reaction, the crude insecticide is water washed to remove the inorganic salt formed during the reaction. This water washing also carries with it some of the compounds formed during the phosphite treatment of the thioate. Low boiling compounds including solvents and some of the remaining products of the phosphite treatment are then removed from the water-washed insecticide by convention distillation techniques.

The amount of phosphite needed for effective treatment will obviously vary with the quality of the thioate to be treated. This amount may be determined by treating a sample of the technical grade thioate with an estimated excess of phosphite, allowing it to react and analyzing for the remaining phosphite. The minimum amount necessary for effective treatment may then be defined to be the amount consumed. For a good quality technical grade thioate, the minimum amount of trimethyl phosphite, for example, is typically about one percent by weight of the thioate to be treated. Since the phosphite is innocuous to the thioate-anion reaction, it is preferred that an excess of phosphite be used. For example, where the minimum amount of trimethyl phosphite is about one percent by weight, preferably the thioate is treated with a weight of trimethyl phosphite equal to about two percent by weight of the thioate to be treated. The amount of other species of phosphites consumed appears to be in a fairly close ratio to the molecular weights of the phosphites. For example, the quantity of triethyl phosphite consumed in treating a thioate is about 1.34 times the amount of trimethyl phosphite consumed in treating another sample of the same thioate.

The choice of individual species of phosphite will depend upon a variety of factors such as the species of thioate and insecticide involved. Since the products of the phosphite treatment are inert diluents, it is desirable they be removed during the purification of the insecticide. Therefore, the choice of phosphites such as trimethyl phosphite or triethyl phosphite is preferred, since the products of treatment with these species of phosphite are relatively low boiling compounds. These are generally easier to separate from the insecticide during the water-washing and distillation steps. Similar factors must be considered if the object is to remove the deactivated impurities from the thioate before it is used for further reactions. These deactivated impurities are conveniently removed by conventional distillation methods.

The temperature at which the treatment is carried out is not critical. The reaction is rapid even at room temperature and below. It is preferred that the treatment occur at about 20° C. or higher, although the temperature may suitably range as low as 0° C. or less. The maximum temperature will generally be dictated by the boiling point of the phosphite used for treatment or in some cases by the boiling point of the thioate to be treated. Although temperatures at or near the boiling points of the thioate or phosphite are suitable, for convenience, it is preferred the treatment temperature be between about 20–80° C.

Although suitable solvents such as toluene and diethyl ether may be used in which to treat the thioate with phosphite, no solvent is necessary, nor is the use of one preferred, as both the phosphites and the thioates are liquid and readily miscible.

The process of the invention as it is incorporated into the process for the preparation of a vinyl diethyl phosphorothioate insecticide is shown in the following preparative example in which parts by weight (w.) bears the same relationship to parts by volume (v.) as does the kilogram to the liter. All analyses are expressed as percent by weight.

Example I.—Preparation of O-[2-chloro-1-(2,5-dichlorophenyl)vinyl] O,O-diethyl phosphorothioate incorporating trimethyl phosphite treatment of diethyl phosphorochloridothioate

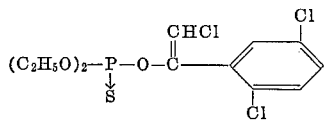

A slurry of 2,2′,5′-trichloroacetophenone anion, sodium salt was prepared by adding slowly 2,2′,5′-trichloroacetophenone (111.7 parts w., 0.5 mole) dissolved in 50 parts v. toluene to sodium methoxide (29.7 parts w., 0.55 mole) slurried in 500 parts v. toluene which had been cooled to −10° C. in a salt-ice bath. The addition rate was adjusted to keep the temperature between −5 and 0° C. As the acetophenone was added, the methoxide dissolved forming a tan, cloudy solution from which the acetophenone sodium salt precipitated shortly after all the acetophenone had been added; 50 parts v. toluene was used as a rinse to complete the transfer of the acetophenone. The slurry was thick, but flowable. These operations were done in a nitrogen atmosphere to exclude air, moisture, and carbon dioxide.

In a reaction vessel equipped with a stirrer, thermometer, addition port, and vacuum connection, trimethyl phosphite (2.8 parts w., 2% w. based on the thioate) was added with stirring to O,O-diethyl phosphorochloridothioate (141.4 parts w., 0.75 mole). This mixture was heated to 70° C. and with the pressure reduced to 140 torr, the anion slurry, at 0° C. in an ice bath, was added in portions through the addition port, using the difference in pressure to effect the transfer. A tendency for the reaction mixture to foam was lessened by reducing the pressure to 100 torr. Heat was applied to compensate for the heat lost by vaporization of the methanol and toluene so that the temperature varied between 65 and 73° C. as each portion of the slurry was added. Addition time was 3.1 hours. The anion slurry vessel was rinsed with 50 parts v., making a total usage of 650 parts v. toluene. The reaction mixture was held at 70° C. and 100 torr for an additional 0.9 hour and then cooled to 35° C.

The reaction mixture was diluted with all the distillate collected during the reaction period and this diluted mixture was washed with 250 parts v. of water. The phases separated readily and the aqueous phase was drained off. A second wash using an additional 250 parts v. water was performed.

The toluene was distilled from the organic phase under reduced pressure; most of the toluene being collected while the kettle was heated to 100° C. at 200 torr. Another fraction comprised of toluene, diethyl phosphorochloridothioate, some phosphite treatment products, and other low boiling compounds was collected to terminal conditions of 125° C. at 0.1 torr. The O-[2-chloro-1-(2,5-dichlorophenyl)vinyl] O,O-diethyl phosphorothioate was recovered as a bottoms product: purity 86% w.; crude yield 90% w. based on the trichloroacetophenone used.

Example II

Following the procedure set forth above, the following four grades of diethyl phosphorochloridothioate were converted to the corresponding insecticide to further illustrate the advantages of the process of the invention.

| | O-[2-chloro-1-(2,5-dichlorophenyl)vinyl]O,O-diethyl phosphorothioate recovered | | |
|---|---|---|---|
| Description of the diethyl phosphorochloridothioate | Crude yield, percent w. | Purity, percent w. | Contained yield, percent molar |
| Technical | 84 | 81 | 68 |
| Flashed technical 65% w. heart cut | 93 | 79 | 73 |
| Technical plus 2% w. trimethyl phosphite | 91 | 85 | 77 |
| Technical plus 2% w. trimethyl phosphite plus recycle thiophosphate [1] | 94 | 85 | 80 |

[1] 1.1 moles technical thioate plus 1.0 mole recovered thioate used per 1 mole of trichloroacetophenone.

The results shown above demonstrate that use of the process of the invention affords a 4% w. increase in purity and a 9–12% m. increase in yield of the ester over untreated thioate and a 6% w. purity increase and a 4–7% m. yield increase over flashed thioate.

We claim as our invention:

1. In the process for the production of β-[2-halo-1-(polyhalophenyl)vinyl] esters of O,O-dialkyl phosphorothioic and O-alkyl alkylphosphonothioic acids by reaction of technical grade O,O-dialkyl phosphorohalidothioates and O-alkyl alkylphosphonohalidothioates, respectively, with an alkali metal salt of an alpha-haloacetophenone anion, wherein the term alkyl represents an alkyl radical of 1–4 carbon atoms and the terms halo and halido represent chlorine or bromine atoms, the improvement which comprises pre-treating the technical grade O,O-dialkyl phosphorohalidothioates and O-alkyl alkylphosphonohalidothioates at a temperature of about 0 to 80° C. with a minor amount of a triester of phosphorus acid of the formula

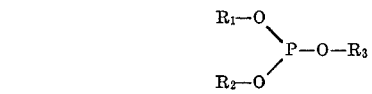

wherein $R_1$, $R_2$ and $R_3$ are any combination of $C_1$–$C_4$ alkyl and $C_6$–$C_{10}$ aryl contained in one or two rings.

2. The improvement of claim 1 wherein $R_1$, $R_2$ and $R_3$ each are all the same alkyl or the same aryl.

3. The improvement of claim 2 wherein $R_1$, $R_2$ and $R_3$ each are all the same alkyl.

4. The improvement of claim 3 wherein $R_1$, $R_2$ and $R_3$ each are all methyl or ethyl.

5. The improvement of claim 3 wherein the O-[2-halo-1-(polyhalophenyl)vinyl] esters are of O,O-dialkyl phosphorothioic acid.

6. The improvement of claim 4 wherein the O-[2-halo-1-(polyhalophenyl)vinyl] esters are of O,O-dialkyl phosphorothioic acid.

7. The improvement of claim 6 wherein the ester is O-[2-chloro-1-(2,5-dichlorophenyl)vinyl] O,O-diethyl phosphorothioate.

References Cited

UNITED STATES PATENTS 3,077,431  2/1963  Baker et al. _____ 260—972X

CHARLES B. PARKER, Primary Examiner

R. L. RAYMOND, Assistant Examiner

U.S. Cl. X.R.

260—957